(12) United States Patent
Ishida et al.

(10) Patent No.: US 11,493,112 B2
(45) Date of Patent: Nov. 8, 2022

(54) SPEED REDUCER

(71) Applicant: SUMITOMO HEAVY INDUSTRIES, LTD., Tokyo (JP)

(72) Inventors: Hiroaki Ishida, Kanagawa (JP); Masayuki Ishizuka, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 17 days.

(21) Appl. No.: 17/135,271

(22) Filed: Dec. 28, 2020

(65) Prior Publication Data

US 2021/0115967 A1   Apr. 22, 2021

Related U.S. Application Data (63) Continuation of application No. PCT/JP2019/023053, filed on Jun. 11, 2019.

(30) Foreign Application Priority Data

Jun. 28, 2018   (JP) .............................. JP2018-122574

(51) Int. Cl.
F16H 1/28    (2006.01)
F16H 1/32    (2006.01)
*F16H 49/00*    (2006.01)

(52) U.S. Cl.
CPC ............. F16H 1/32 (2013.01); *F16H 49/001* (2013.01)

(58) Field of Classification Search
CPC ................................ F16H 1/32; F16H 49/001
See application file for complete search history.

(56) References Cited

U.S. PATENT DOCUMENTS

| | | | | |
|---|---|---|---|---|
| 5,906,142 A | * | 5/1999 | Shirasawa | ............. F16H 49/001 |
| | | | | 74/640 |
| 6,682,220 B2 | | 1/2004 | Kobayashi | |
| 6,968,755 B2 | | 11/2005 | Kobayashi et al. | |
| 7,128,469 B2 | | 10/2006 | Kobayashi et al. | |
| 7,901,317 B2 | * | 3/2011 | Yamamoto | ................ F16H 1/32 |
| | | | | 475/168 |

(Continued)

FOREIGN PATENT DOCUMENTS

| | | | |
|---|---|---|---|
| EP | 2772664 A2 * | 9/2014 | ............... F16H 1/32 |
| JP | 2002-339990 A | 11/2002 | |

(Continued)

OTHER PUBLICATIONS

International Search Report issued in Application No. PCT/JP2019/023053, dated Sep. 3, 2019.

*Primary Examiner* — Adam D Rogers (74) *Attorney, Agent, or Firm* — Michael Best & Friedrich LLP (57) ABSTRACT

A speed reducer includes a reduction mechanism, which includes an internal gear and an external gear meshing with the internal gear, and a first member, and transmits rotating motion decelerated by the reduction mechanism to a driven member. The speed reducer includes a protection member disposed between the first member and the driven member. The first member is formed of a material having specific gravity lower than at least one of the internal gear and the external gear and hardness lower than the driven member. The protection member is formed of a material having hardness higher than the first member.

10 Claims, 8 Drawing Sheets

(56) References Cited

U.S. PATENT DOCUMENTS

| | | | |
|---|---|---|---|
| 9,382,993 B2* | 7/2016 | Murayama | F16H 57/029 |
| 9,500,234 B2 | 11/2016 | Kobayashi et al. | |
| 10,514,109 B2* | 12/2019 | Miyachi | F16H 1/32 |
| 2007/0214644 A1* | 9/2007 | Kanai | B23K 20/002 |
| | | | 29/893 |
| 2018/0371964 A1* | 12/2018 | Miyachi | F16H 35/008 |

FOREIGN PATENT DOCUMENTS

| | | | |
|---|---|---|---|
| JP | 2018-091429 A | | 6/2018 |
| JP | 2019132364 A | * | 8/2019 |
| WO | WO-2014/181373 A1 | | 11/2014 |

* cited by examiner

SPEED REDUCER

RELATED APPLICATIONS

The contents of Japanese Patent Application No. 2018-122574, and of International Patent Application No. PCT/JP2019/023053, on the basis of each of which priority benefits are claimed in an accompanying application data sheet, are in their entirety incorporated herein by reference.

BACKGROUND

Technical Field

Certain embodiments of the present invention relate to a speed reducer.

Description of Related Art

There has been a speed reducer that decelerates rotating motion and outputs the decelerated rotating motion to a driven member from the past. A member that is connected to the driven member and outputs the rotating motion is called an output member. In general, each member configuring the speed reducer including the output member is configured by a member having high strength such as steel.

A speed reducer including a lightweight bearing and a lightweight internal gear is disclosed in the related art. In the bearing of the related art, a main body member is formed of an aluminum alloy, and a raceway surface forming member is formed of an iron-based material. In the internal gear of the related art, a main body member is formed of an aluminum alloy, and a teeth portion forming member is formed of an iron-based material.

SUMMARY

According to an aspect of the present invention, there is provided a speed reducer that includes a reduction mechanism, which includes an internal gear and an external gear meshing with the internal gear, and a first member, and transmits rotating motion decelerated by the reduction mechanism to a driven member.

The speed reducer further includes a protection member disposed between the first member and the driven member.

The first member is formed of a material having specific gravity lower than at least one of the internal gear and the external gear and hardness lower than the driven member.

The protection member is formed of a material having hardness higher than the first member.

According to another aspect of the present invention, there is provided a speed reducer that includes a reduction mechanism, which includes an internal gear and an external gear meshing with the internal gear, and a first member, and transmits rotating motion decelerated by the reduction mechanism to a driven member.

The speed reducer further includes a protection member disposed between the first member and the driven member.

The first member is formed of a material having specific gravity lower than at least one of the internal gear and the external gear and hardness higher than the driven member.

The protection member is formed of a material having hardness lower than the first member.

DETAILED DESCRIPTION

When a member making rotating motion is formed of a material having high specific gravity such as steel, the moment of inertia of an internal mechanism is high and a load on a motor that inputs rotating motion to a speed reducer increases.

However, in order to reduce such an obstacle, for example, when a first member that comes into contact with a driven member is changed to a lightweight material, a relatively large difference occurs between the hardness of the first member and the hardness of the driven member in some cases. When there is a difference in hardness, one of the driven member and the first member is likely to become damaged when connecting the driven member. The damage to this port ion is a factor of decreasing connection accuracy between an output member and the driven member.

It is desirable to provide a speed reducer that can reduce the moment of inertia of the internal mechanism and can suppress the occurrence of damage between members when connecting the driven member.

Hereinafter, each embodiment of the present invention will be described in detail with reference to the drawings.

First Embodiment

Figure 1:
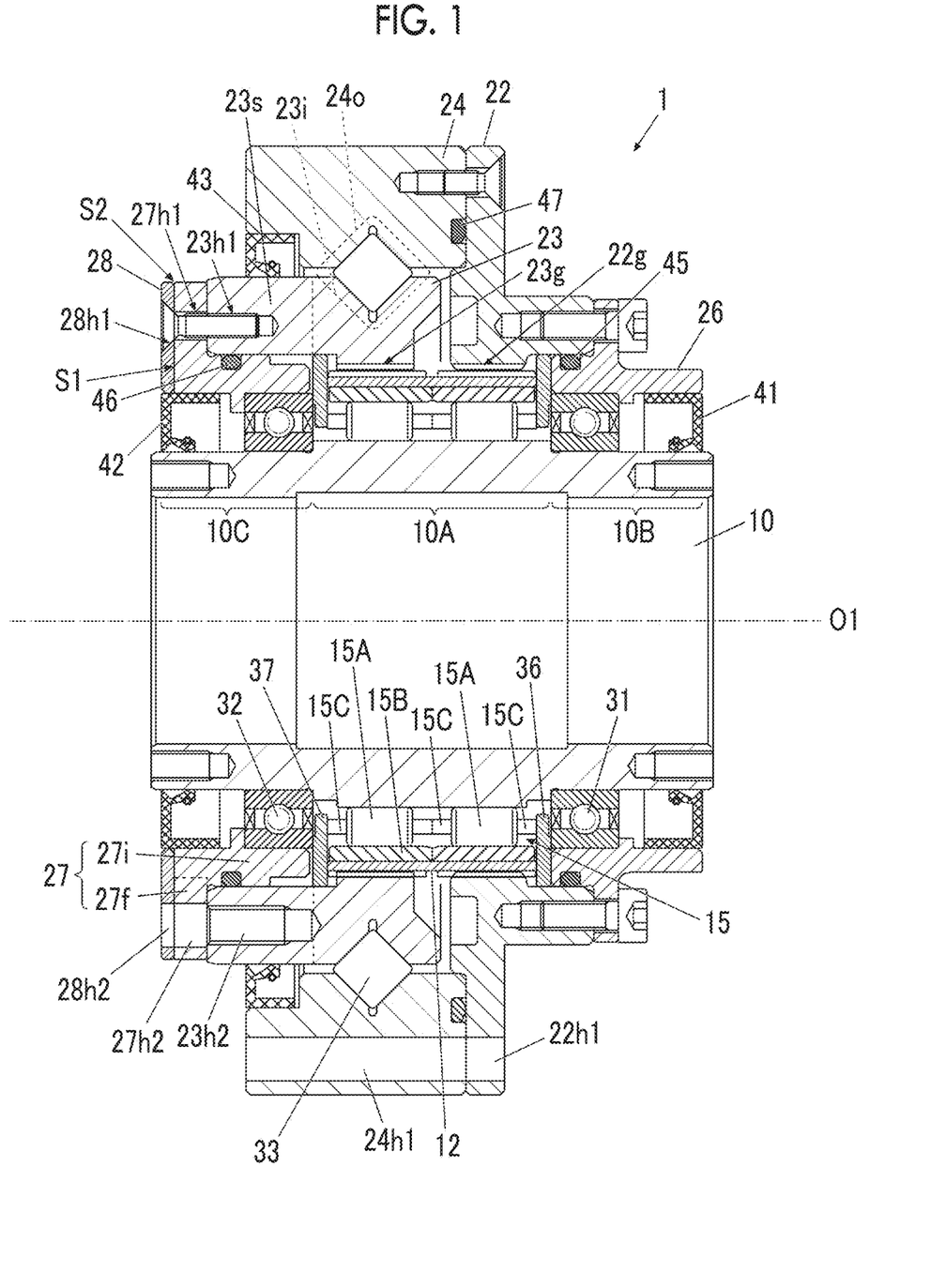
FIG. 1 is a sectional view illustrating a speed reducer according to a first embodiment of the present invention.

FIG. 1 is a sectional view illustrating a speed reducer according to a first embodiment of the present invention. In the present specification, a direction along a rotation axis O1 is defined as an axial direction, a direction perpendicular to the rotation axis O1 is defined as a radial direction, and a rotation direction about the rotation axis O1 is defined as a circumferential direction.

A speed reducer 1 according to the embodiment of the present invention is a flexible meshing type gear device in which an external gear 12 flexibly deforms to transmit rotating motion. As illustrated in FIG. 1, the speed reducer 1 includes a wave generator shaft 10, the external gear 12 that is flexibly deformed by the wave generator shaft 10, a first internal gear 22g and a second internal gear 23g that mesh with the external gear 12, and a wave generator bearing 15. The speed reducer 1 further includes a first casing 22, a second member 23 that has the second internal gear 23g, a second casing 24, a first cover 26, a second cover 27, a protection member 28, bearings 31 and 32, a main bearing 33, oil seals 41 to 43, and O-rings 45 to 47.

Among these, the wave generator shaft 10, the external gear 12, the first internal gear 22g, the second internal gear 23g, and the wave generator bearing 15 correspond to an example of a reduction mechanism according to the embodiment of the present invention. In addition, the second cover 27 is an output member and corresponds to an example of a first member according to the embodiment of the present invention.

The speed reducer 1 is incorporated into, for example, a drive system. Rotating motion is input from the right in FIG. 1, and the decelerated rotating motion is output to the left in FIG. 1. A side from which rotating motion is input will be called a "motor side", and a side to which rotating motion is output will be called a "load side".

The wave generator shaft 10 is a hollow shaft and has a wave generator 10A, of which a section perpendicular to the rotation axis O1 has an elliptical shape, and shaft portions 10B and 10C, which are provided on both sides of the wave generator 10A in the axial direction and of which a section perpendicular to the rotation axis O1 has a circular shape. The elliptical shape does not need to be a geometrically exact ellipse and includes a substantially elliptical shape. The wave generator shaft 10 rotates about the rotation axis O1, and the center of an external shape of the section of the wave generator 10A perpendicular to the rotation axis O1 matches the rotation axis O1.

The external gear 12 is a flexible cylindrical metal and has teeth on an outer periphery thereof.

The wave generator bearing 15 is disposed between the wave generator 10A and the external gear 12. The wave generator bearing 15 has a plurality of rolling elements (rollers) 15A, an outer ring 15B, and holders 15C that hold the plurality of rolling elements 15A. The plurality of rolling elements 15A roll on an outer peripheral surface of the wave generator 10A and an inner peripheral surface of the outer ring 15B which are raceway surfaces. The wave generator bearing 15 may have an inner ring different from the wave generator 10A.

One of the first internal gear 22g and the second internal gear 23g meshes with a teeth portion on one side from the center of the external gear 12 in the axial direction, and the other meshes with a teeth portion on the other side from the center of the external gear 12 in the axial direction.

On both sides of the external gear 12, the outer ring 15B, and the holders 15C of the wave generator bearing 15 in the axial direction, spacer rings 36 and 37 that are in contact therewith and prevent displacement thereof in the axial direction are provided.

The first casing 22 and the second casing 24 are connected to each other and cover a radially outer side of the first internal gear 22g, the second internal gear 23g, and the external gear 12. The first casing 22 is provided with internal teeth on a part of an inner peripheral portion thereof to configure the first internal gear 22g. In the first casing 22, the portion of the first internal gear 22g and the other portion are integrally formed of a single material. The second casing 24 is provided with an outer ring 24o of the main bearing 33, on a part of an inner peripheral portion thereof. The portion of the outer ring 24o and the other portion of the second casing 24 are integrally formed of a single material.

At least a part of the second member 23 is disposed on a radially inner side of the second casing 24 and a radially outer side of the wave generator shaft 10, an inner ring 23i of the main bearing 33 is provided at a part of an outer peripheral portion thereof, and a teeth portion is provided at a part of an inner peripheral portion thereof to configure the second internal gear 23g. The portion of the inner ring 23i, the portion of the second internal gear 23g, and the other portion are integrally formed of a single material.

The main bearing 33 is, for example, a cross roller bearing and is disposed between the second member 23 and the second casing 24. The second casing 24 supports the second member 23 to rotate freely via the main bearing 33. The main bearing 33 has the inner ring 23i provided at the second member 23, the outer ring 24o provided at the second casing 24, and a plurality of rolling elements disposed between the inner ring 23i and the outer ring 24o. The main bearing 33 may be configured by a plurality of bearings (angular ball bearings and tapered bearings) that are separated from each other in the axial direction between the second member 23 and the second casing 24.

The first cover 26 is connected to the first casing 22 and covers an outer peripheral portion of the wave generator shaft 10 on the motor side.

The second cover 27 is connected to the second member 23 and covers an outer peripheral portion of the wave generator shaft 10 on the load side. The second cover 27 has a flange portion 27f disposed on the load side of the second member 23 and a hollow shaft portion 27i fitted between the second member 23 and the bearing 32. The hollow shaft portion 27i is provided with, on an outer peripheral portion thereof, a groove on which the O-ring 46 is mounted. An end surface of the flange portion 27f on the load side corresponds to an axial facing surface S1 which faces a driven member 62 (FIG. 2) in the axial direction.

The bearings 31 and 32 are, for example, ball bearings, and each have an inner ring, an outer ring, and a plurality of rolling elements. One bearing 31 is disposed between the shaft portion 10B of the wave generator shaft 10 on the motor side and the first cover 26. The other bearing 32 is disposed between the shaft portion 10C of the wave generator shaft 10 on the load side and the hollow shaft portion 27i of the second cover 27. The first cover 26 and the second cover 27 rotatably support the wave generator shaft 10 via bearings 31 and 32.

One oil seal 41 is disposed between the wave generator shaft 10 and the first cover 26 at an end portion on the motor side, and suppresses the outflow of a lubricant to the motor side. The other oil seal 42 is disposed between the wave generator shaft 10 and the hollow shaft portion 27i of the second cover 27 at an end portion on the load side, and suppresses the outflow of the lubricant to the load side. The oil seal 43 is disposed between the second casing 24 and the second member 23, and suppresses the outflow of the lubricant from this portion.

The O-rings 45 to 47 are provided between the first casing 22 and the first cover 26, between the second member 23 and the second cover 27, and between the first casing 22 and the second casing 24, respectively, and suppress the movement of the lubricant therebetween.

The protection member 28 is a member interposed between the second cover 27 and the driven member 62 when the driven member 62 (FIG. 2) and the second cover 27 are connected to each other. The protection member 28 is a plate-shaped member that has a thickness in the axial direction and a plate surface expanding in the radial direction, and has an annular shape that substantially overlaps an end surface of the second cover 27 on the load side when viewed in the axial direction. The thickness of the protection member 28 in the axial direction is smaller than the thickness of the flange portion 27f of the second cover 27 in the axial direction in order to reduce the moment of inertia of an internal mechanism of the speed reducer 1. The protection member 28 is disposed on the radial outer side of the oil seal 42.

Without being limited to this form, the protection member 28 may be provided with, for example, a hole that penetrates a part thereof in the axial direction, or may have a shape that does not overlap a part of the end surface of the second cover 27 on the load side when viewed from the axial direction. In addition, the protection member 28 may have a form of being divided into a plurality of portions in the circumferential direction, or may be thicker than the flange portion 27f. The protection member 28 is adjacent to at least a part of the second cover 27 in the axial direction. Herein, "adjacent" means to include being adjacent with a gap therebetween.

Material for Each Member

The wave generator shaft 10, the first casing 22 having the first internal gear 22g, the second casing 24, the first cover 26, the second member 23 having the second internal gear 23g, the external gear 12, the outer ring 15B of the wave generator bearing 15, the spacer rings 36 and 37, the inner ring 23i of the main bearing 33, the outer ring 24o of the main bearing 33, and the protection member 28 are formed of a steel material.

Without being particularly limited thereto, more specifically, the wave generator shaft 10, the first casing 22 having the first internal gear 22g, and the second casing 24 are formed of a steel material such as chrome molybdenum steel. The first cover 26 and the second member 23 having the second internal gear 23g are formed of a steel material such as carbon steel. The external gear 12 is formed of a steel material such as nickel-chromium molybdenum steel. The outer ring 15B of the wave generator bearing 15 and the spacer rings 36 and 37 are formed of a steel material such as high carbon chromium bearing steel material. The inner ring 23i of the main bearing 33 is formed of a steel material such as carbon steel. The outer ring 24o of the main bearing 33 is formed of a steel material such as high carbon chromium bearing steel. The protection member 28 is formed of a steel material such as carbon steel.

The second cover 27 is formed of a lightweight material such as aluminum, magnesium, an aluminum alloy, and a magnesium alloy. These lightweight materials have specific gravity lower than the steel materials and hardness lower than the steel materials.

Drive System

Figure 2:
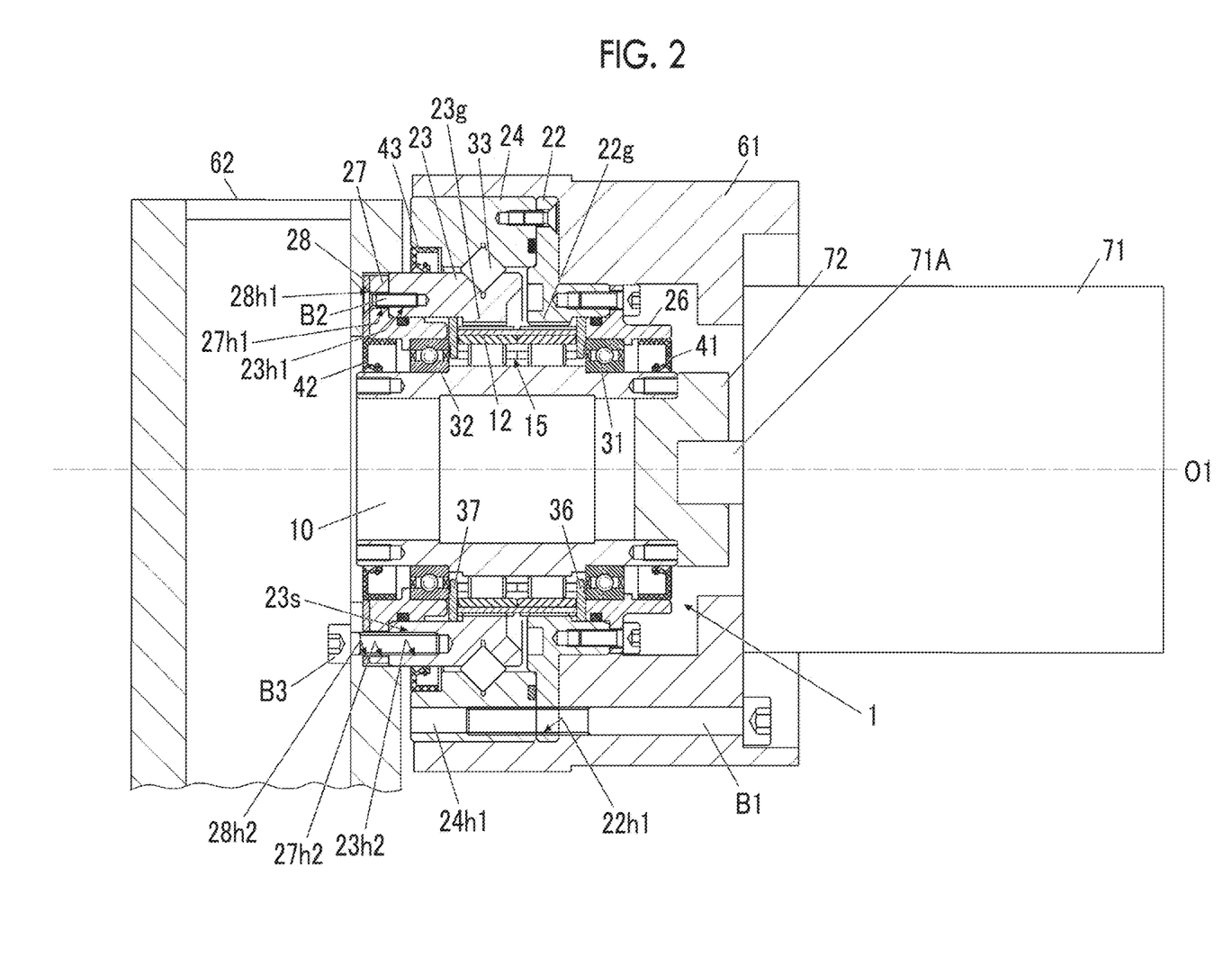
FIG. 2 is a view illustrating a drive system in which the speed reducer of FIG. 1 is incorporated.

FIG. 2 is a view illustrating the drive system in which the speed reducer of FIG. 1 is incorporated.

The first casing 22 and the second casing 24 are provided with bolt holes 22h1 and 24h1 which extend in the axial direction and communicate with each other. A female screw is provided in one bolt hole 24h1. The bolt holes 22h1 and 24h1 are provided at a plurality of locations in the circumferential direction.

A fixing member 61, which is a base portion of the drive system, is connected to the first casing 22 and the second casing 24 via a plurality of bolts B1 (one bolt B1 is illustrated in FIG. 2). The plurality of bolts B1 are screwed into the bolt holes 24h1 of the second casing 24 through the bolt holes 22h1 of the first casing 22. It is not necessary for the fixing member 61 to have a structure that does not move, and in a case where the entire drive system configures a part of a moving mechanism, the fixing member 61 moves in some cases.

A motor 71 is fixed to the fixing member 61. A motor shaft 71A is connected to the wave generator shaft 10 via, for example, a connection member 72.

The second member 23 has, on the load side, an annular portion 23s about the rotation axis O1, and the annular portion 23s is provided with bolt holes 23h1 and 23h2 extending in the axial direction. Female screws are provided in the bolt holes 23h1 and 23h2. The bolt holes 23h2 are provided at a plurality of locations in the circumferential direction.

The protection member 28 and the flange portion 27f of the second cover 27 are provided with bolt holes 28h1, 28h2, 27h1, and 27h2 that communicate with the bolt holes 23h1 and 23h2 of the second member 23. The bolt holes 28h2 and 27h2 are provided at a plurality of locations in the circumferential direction. A temporary fixing bolt B2 is tightened into the bolt holes 28h1, 27h1, and 23h1 to fix the protection member 28, the second cover 27, and the second member 23 to each other.

The driven member 62, which is a drive target, is disposed on the load side of the speed reducer 1, and is connected to the second cover 27 and the second member 23 via a plurality of bolts B3 (one bolt B3 is illustrated in FIG. 2). The plurality of bolts B3 pass through the bolt holes 28h2 and 27h2 of the protection member 28 and the second cover 27 and are screwed into the bolt holes 23h2 of the second member 23. The protection member 28 and the second cover 27 are tightened together between the driven member 62 and the second member 23.

Description on Operation

When the motor 71 is driven to rotate the wave generator shaft 10, the motion of the wave generator 10A is transmitted to the external gear 12. In this case, the external gear 12 is restricted to have a shape along the outer peripheral surface of the wave generator 10A, and is bent into an elliptical shape having a major axis portion and a minor axis portion when viewed from the axial direction. Further, the external gear 12 meshes with the fixed first internal gear 22g at the major axis portion. For this reason, the external gear 12 does not rotate at the same rotation speed as the wave generator 10A, and the wave generator 10A relatively rotates inside the external gear 12. With this relative rotation, the external gear 12 is flexibly deformed so that a major axis position and a minor axis position move in the circumferential direction. The cycle of this deformation is proportional to the rotation cycle of the wave generator shaft 10.

When the external gear 12 flexibly deforms, the major axis position moves so that a meshing position between the external gear 12 and the first internal gear 22g changes in the rotation direction. Herein, when it is assumed that the number of teeth of the external gear 12 is 100 and the number of teeth of the first internal gear 22g is 102, the meshing teeth between the external gear 12 and the first internal gear 22g are shifted each time the meshing position goes around, and accordingly the external gear 12 rotates (spins). With the number of teeth described above, the rotating motion of the wave generator shaft 10 is decelerated at a reduction ratio of 100:2 and is transmitted to the external gear 12.

On the other hand, since the external gear 12 also meshes with the second internal gear 23g, a meshing position between the external gear 12 and the second internal gear 23g also changes in the rotation direction due to the rotation of the wave generator shaft 10. Herein, when it is assumed that the number of teeth of the second internal gear 23g and the number of teeth of the external gear 12 are the same, the external gear 12 and the second internal gear 23g do not rotate relatively, and the rotating motion of the external gear 12 is transmitted to the second internal gear 23g at a reduction ratio of 1:1. Consequently, the rotating motion of the wave generator shaft 10 is decelerated at a reduction ratio of 100:2 and is transmitted to the second member 23 and the second cover 27, and this rotating motion is output to the driven member 62.

When torque is transmitted from the second member 23 to the driven member 62, only a torsional moment acts on the second cover 27 that is tightened together therebetween, and thereby a large load is not applied unlike the teeth portion of the second internal gear 23g or a raceway surface of the main bearing 33. In addition, in a case where a load in the radial direction is generated on the driven member 62 with respect to the fixing member 61, this load is mainly received by the main bearing 33 and does not significantly act on the second cover 27. Further, since the motor 71 is fixed to the fixing member 61, a large radial load is not applied from the motor 71 to the wave generator shaft 10. For this reason, a large radial load does not act on the second cover 27 via the bearing 32.

For this reason, even when the second cover 27 is formed of a lightweight material as described above, a large load is not applied to the second cover 27. Therefore, the low strength of the lightweight material does not adversely affect the operation of the speed reducer 1. On the other hand, since the weight saving of the second cover 27 is achieved, the moment of inertia of the internal mechanism of the speed reducer 1 is decreased, and a load on the motor 71 can be reduced accordingly. Further, since the second cover 27 is integrally formed of one lightweight material, the second cover can be manufactured at a low cost compared with a component in which a plurality of types of materials are combined.

On the other hand, when the second cover 27 is formed of a lightweight material, a relatively large difference in hardness between the second cover 27 and the driven member 62 occurs in some cases. For example, when the driven member 62 is formed of a steel material, the hardness of the second cover 27 is lower than the hardness of the driven member 62. In this case, if the driven member 62 and the second cover 27 come into direct contact with each other when connecting the driven member 62 to the speed reducer 1, there is a possibility that the second cover 27 becomes damaged. However, in the present embodiment, the protection member 28 covers an end surface of the driven member 62 on the load side, and the protection member 28 has hardness higher than the second cover 27. Therefore, when connecting the driven member 62, the connected portion is unlikely to be damaged, and high connection accuracy between the driven member 62 and the speed reducer 1 is obtained.

As described above, in the speed reducer 1 of the first embodiment, the second cover 27 has specific gravity lower than the first internal gear 22g, the second internal gear 23g, and the external gear 12, and has hardness lower than the driven member 62. Further, on the load side of the second cover 27, the protection member 28 formed of a material having hardness higher than the second cover 27 is provided. Therefore, the weight saving of the second cover 27 can reduce the moment of inertia of the internal mechanism of the speed reducer 1. In addition, when connecting the speed reducer 1 and the driven member 62 to each other, the occurrence of damage to the second cover 27 formed of a lightweight material is suppressed, and the high connection accuracy of the driven member 62 is obtained.

In addition, in the speed reducer 1 of the first embodiment, the second cover 27 is connected to the second member 23. Further, the second member 23 has a raceway surface of the inner ring 23i of the main bearing 33, and is formed of the same material as the second internal gear 23g. Therefore, it is possible to adopt a configuration where when torque is transmitted from the speed reducer 1 to the driven member 62, a large load is applied from the second member 23 to the driven member 62, and the large load is not applied to the second cover 27. Accordingly, even when the strength of the second cover 27 is reduced, an adverse effect of the reduction on the operation of the speed reducer 1 can be suppressed.

Further, in the second member 23 of the speed reducer 1 of the first embodiment, the portion of the second internal gear 23g and the portion of the annular portion 23s are integrally formed of a single material. Therefore, component costs are reduced by integrally forming portions requiring high strength, and an adverse effect of a reduction in the strength of the second cover 27 due to the lightweight material on the speed reducer 1 is reduced by connecting the second cover 27 formed of a lightweight material to the second member 23.

In a case where the specific gravity of each of the first internal gear 22g and the second internal gear 23g and the specific gravity of the external gear 12 are different from each other, the second cover 27 need only have specific gravity lower than at least one of them, and accordingly an effect is obtained in which the moment of inertia of the internal mechanism can be reduced.

In addition, in a case where the specification of the speed reducer 1 defines an allowable range of the hardness of the driven member 62 to be connected, the protection member 28 has the same operational effect when the hardness of the second cover 27 is lower than the maximum value of the hardness of the driven member 62.

Second Embodiment

Figure 3A:
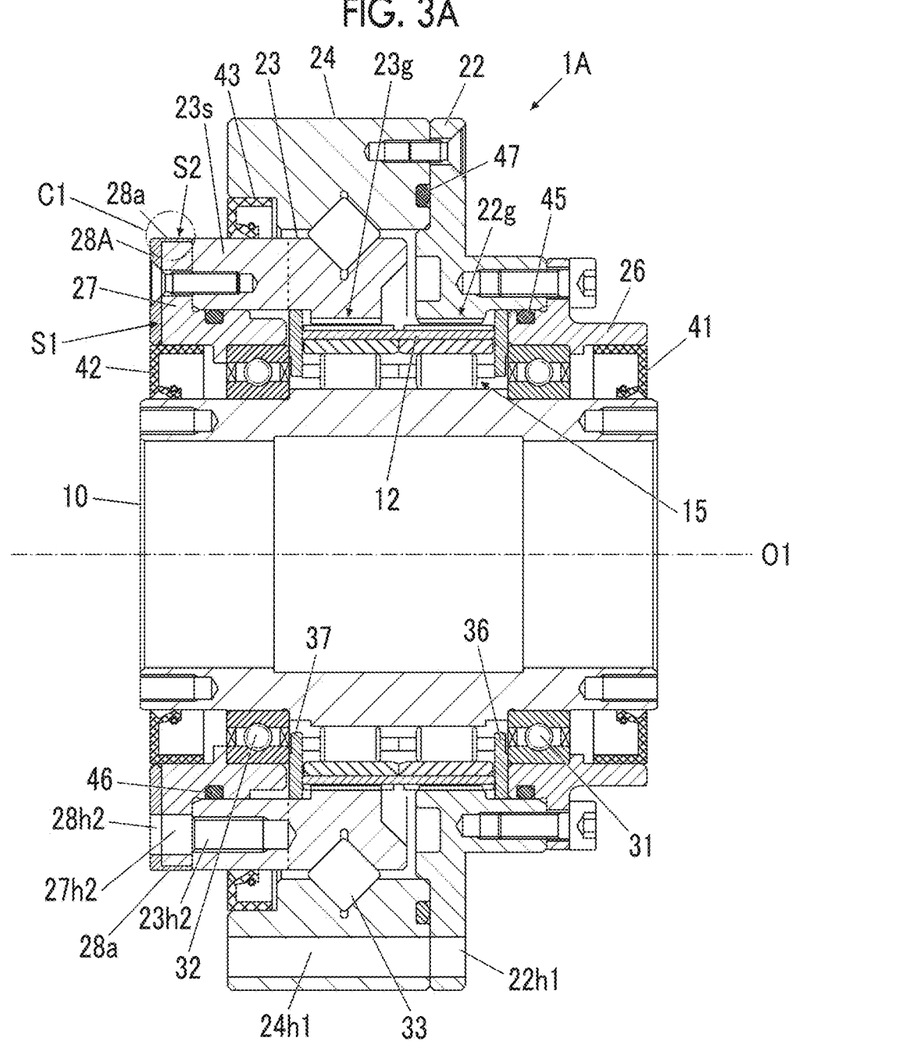
FIG. 3A is a sectional view illustrating a speed reducer according to a second embodiment of the present invention.
Figure 3B:
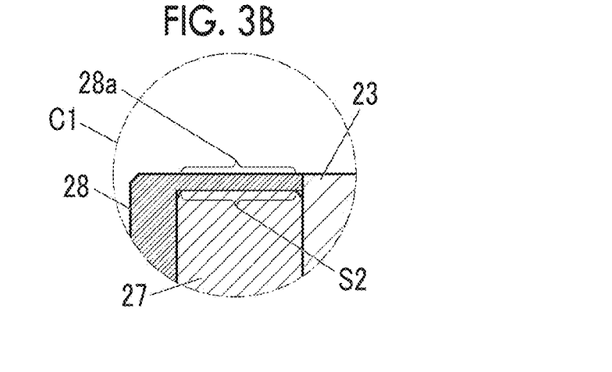
FIG. 3B is a partially enlarged view illustrating a part of FIG. 3A.
Figure 4:
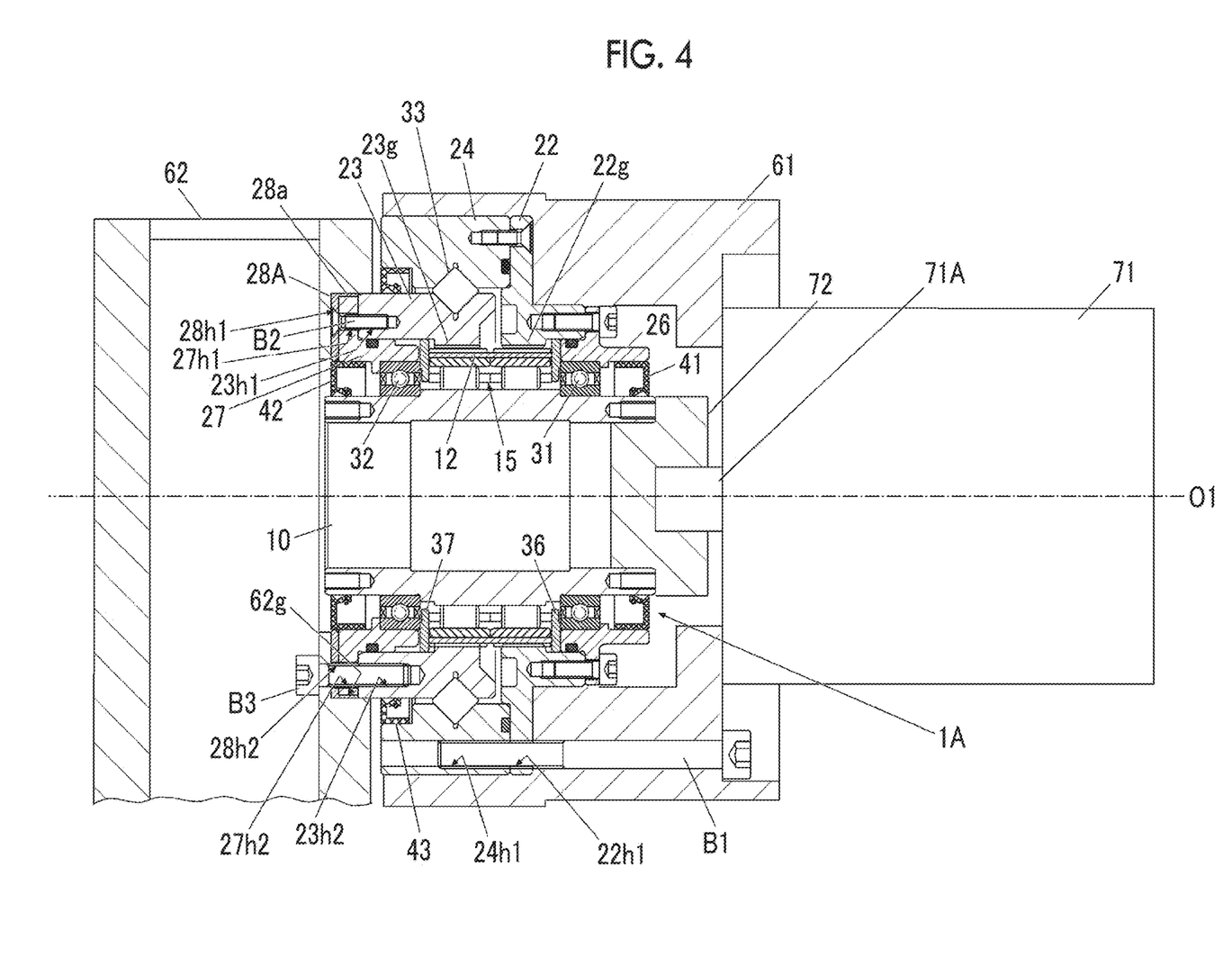
FIG. 4 is a view illustrating a drive system in which the speed reducer of FIGS. 3A and 3B is incorporated.

FIG. 3A is a sectional view illustrating a speed reducer according to a second embodiment of the present invention. FIG. 3B is a partially enlarged view illustrating a part of FIG. 3A. FIG. 4 is view illustrating a drive system in which the speed reducer of FIGS. 3A and 3B is incorporated.

A speed reducer 1A and the drive system of the second embodiment are mainly the same as in the first embodiment except for the form of a protection member 28A. The same components will be assigned with the same reference signs in the first embodiment, and detailed description thereof will be omitted.

In the second embodiment, end portions of the second cover 27 and the second member 23 on the load side are spigot-fitted into a recessed portion 62g of the driven member 62 (refer to FIG. 4). The second cover 27 has the axial facing surface S1 that faces the driven member 62 in the axial direction and a radial facing surface S2 that faces the driven member 62 in the radial direction (refer to FIGS. 3A and 3B).

The protection member 28A of the second embodiment is provided at the axial facing surface S1 and the radial facing surface S2 of the second cover 27. That is, the protection member 28A has a tubular first extension portion 28a along the radial facing surface S2 of the second cover 27, in addition to the plate-shaped form of the first embodiment. Although the first extension portion 28a is provided over the entire area in the circumferential direction, there may be a notch in a part of the first extension portion 28a in the circumferential direction, or the protection member 28A including the first extension portion 28a may be divided into a plurality of portions in the circumferential direction.

An outer peripheral surface of the protection member 28A has substantially the same diameter as an outer peripheral surface of the annular portion 23s of the second member 23, and the recessed portion 62g (FIG. 4) of the driven member 62 is spigot-fitted so as to be hung on the annular portion 23s of the second member 23 beyond the first extension portion 28a of the protection member 28A. That is, the driven member 62 is spigot-fitted to an outer periphery of the protection member 28A.

As described above, in the speed reducer 1A of the second embodiment, since the protection member 28A is provided at the axial facing surface S1 and the radial facing surface S2 of the second cover 27, the occurrence of damage to the radial facing surface S2 of the second cover 27 can also be suppressed when connecting the driven member 62.

Third Embodiment

Figure 5:
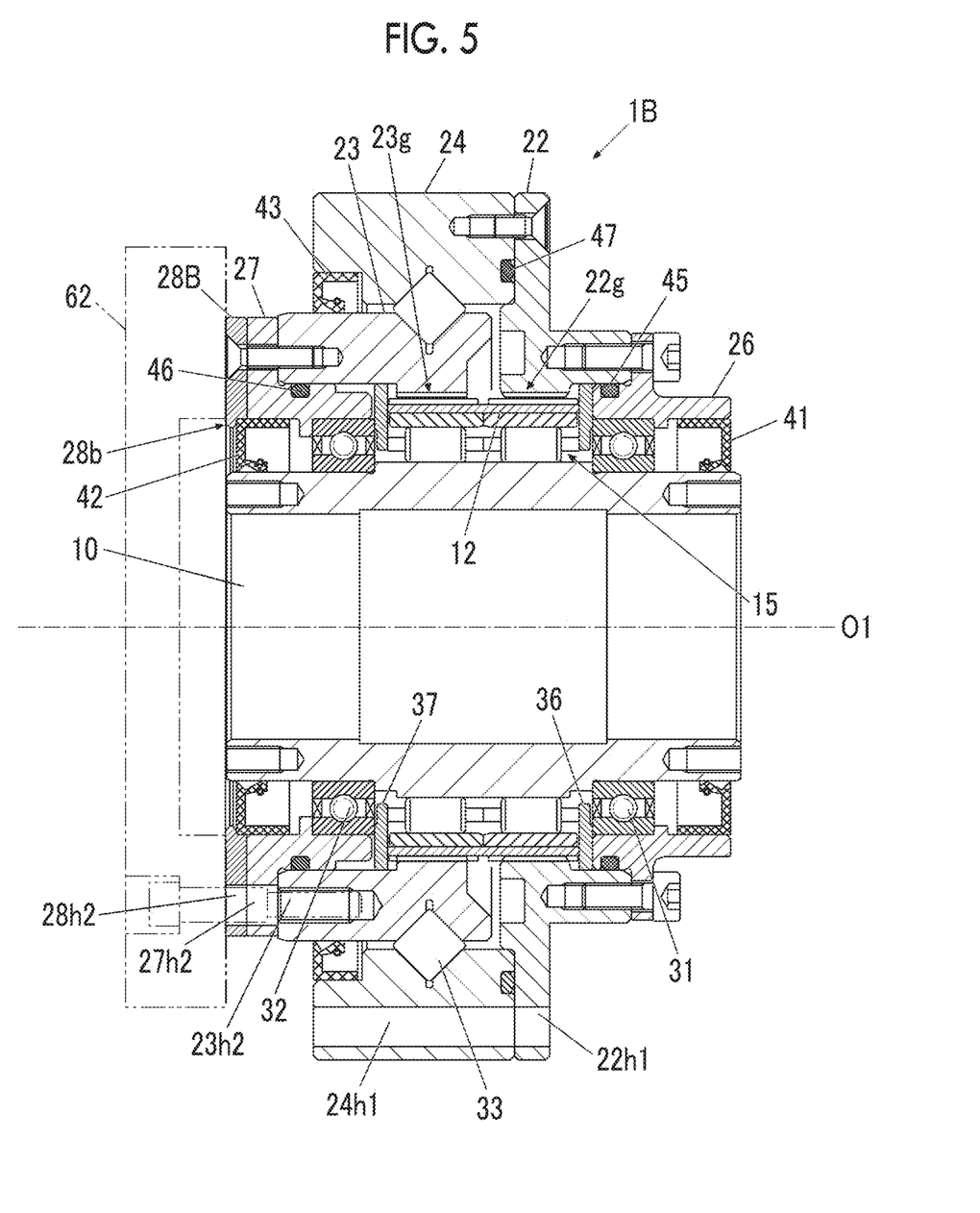
FIG. 5 is a sectional view illustrating a speed reducer according to a third embodiment of the present invention.

FIG. 5 is a sectional view illustrating a speed reducer according to a third embodiment of the present invention.

A speed reducer 1B of the third embodiment is provided with, on an inner peripheral portion of the protection member 28B, a second extension portion 28b that engages with (faces in the axial direction) a part of the oil seal 42 adjacent to the second cover 27. Other than that, it is almost the same as in the first embodiment. The second extension portion 28b may be provided on the protection member 28A of the second embodiment. In FIG. 5, the driven member 62 is shown with an imaginary line.

As described above, in the speed reducer 1B of the third embodiment, the second extension portion 28b enables the protection member 28B to function as a retaining member for the oil seal 42.

Fourth Embodiment

Figure 6:
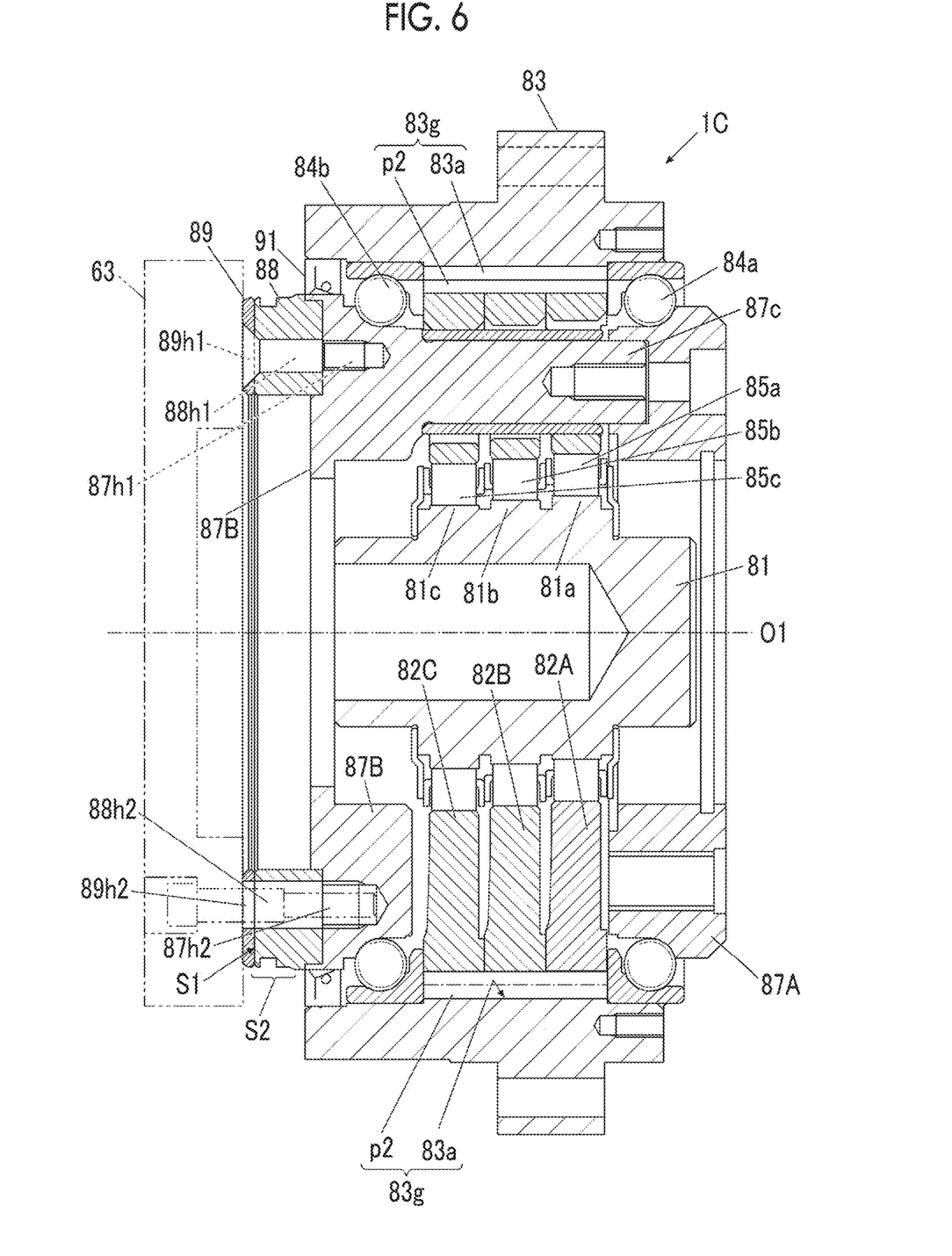
FIG. 6 is a sectional view illustrating a speed reducer according to a fourth embodiment of the present invention.

FIG. 6 is a sectional view illustrating a speed reducer according to a fourth embodiment of the present invention.

A speed reducer 1C of the fourth embodiment is an example in which the present invention is applied to an eccentric oscillation type speed reducer. The speed reducer 1C includes, as a reduction mechanism, an eccentric body shaft 81 having a plurality of eccentric bodies 81a, 81b, and 81c, a plurality of oscillating external gears 82A, 82B, and 82C, a casing 83 covering the radially outer side of the oscillating external gears, and an internal gear 83g provided on an inner peripheral portion of the casing 83. The internal gear 83g includes a plurality of pin grooves 83a provided in an inner peripheral portion of the casing 83 so as to be arranged in the circumferential direction and a plurality of outer pins p2 held in the pin grooves 83a. The external gears 82A, 82B, and 82C are fitted onto the eccentric bodies 81a, 81b, and 81c via eccentric body bearings 85a, 85b, and 85c, and oscillate as the eccentric body shaft 81 rotates.

The speed reducer 1C further includes carriers 87A and 87B that move in synchronization with the spinning of the external gears 82A, 82B, and 82C, an output member 88 that is connected to a driven member 63 (shown with an imaginary line in FIG. 6) together with the carrier 87B, and a protection member 89 that is provided on an end surface (axial facing surface S1) of the output member 88 on the load side. The carriers 87A and 87B have an inner pin 87c passing through through-holes of the external gears 82A, 82B, and 82C. As the external gears 82A, 82B, and 82C spin, this motion is transmitted to the carriers 87A and 87B via the inner pin 87c. The carriers 87A and 87B are supported to rotate freely by the casing 83 via main bearings 84a and 84b. The output member 88 corresponds to an example of the first member according to the embodiment of the present invention.

In a case where the speed reducer 1C is incorporated into a drive system, a fixing member that is a base portion of the drive system is connected to the casing 83. Further, a motor is fixed to the fixing member, and a motor shaft is connected to the eccentric body shaft 81.

The carrier 87B, the output member 88, and the protection member 89 on the load side are provided with bolt holes 87h1, 87h2, 88h1, 88h2, 89h1, and 89h2 that communicate in the axial direction from the end surface on the load side, respectively. Female screws are provided in the bolt holes 87h1 and 87h2. A temporary fixing bolt is tightened into the bolt holes 87h1 to 89h1 on one side to fix the carrier 87B, the output member 88, and the protection member 89 to each other. The bolt holes 87h2 to 89h2 on the other side are provided at a plurality of locations in the circumferential direction, and bolts for fixing the driven member 63 are tightened therein. Accordingly, the driven member 63 and the carrier 87B are connected to each other, and the output member 88 and the protection member 89 are tightened together therebetween.

The casing 83, the external gears 82A, 82B, and 82C, the eccentric body shaft 81, the carriers 87A and 87B, and the protection member 89 are formed of a steel material. The protect ion member 89 has hardness higher than the output member 88.

The output member 88 is formed of a lightweight material such as aluminum, an aluminum alloy, magnesium, and a magnesium alloy. The output member 88 has hardness lower than the driven member 63 connected to the speed reducer 1C.

Description on Operation

When the eccentric body shaft 81 rotates about the rotation axis O1 by the driving of the motor, the eccentric bodies 81a, 81b, and 81c eccentrically rotate inside the through-holes of the external gears 82A, 82B, and 82C. Accordingly, the external gears 82A, 82B, and 82C oscillate in phases different from each other, and these oscillations change a meshing position between the external gears 82A, 82B, and 82C and the internal gear 83g. The meshing position goes around in the circumferential direction each time the eccentric bodies 81a, 81b, and 81c make one rotation. When the meshing position goes around, the external gears 82A, 82B, and 82C spin by a difference in the number of teeth between the external gears 82A, 82B, and 82C and the internal gear 83g. That is, the rotating motion of the eccentric body shaft 81 is decelerated at a ratio of "a difference in the number of teeth between the internal gear 83g and the external gear 82A/the total number of teeth of the external gear 82A", and is converted into the spinning motion of the external gears 82A, 82B, and 82C. This spinning motion is transmitted to the carriers 87A and 87B via the inner pin 87c and is output to the driven member 63.

In the speed reducer 1C of the fourth embodiment, the output member 88 and the protection member 89 enable even the eccentric oscillation type speed reducer to obtain the same effect as in the first embodiment. That is, since the output member 88 is formed of a lightweight material, the moment of inertia of the internal mechanism is reduced, and a load on the motor can be reduced. Further, when connecting the driven member 63 to the speed reducer 1C, the protection member 89 is interposed between the output member 88 and the driven member 63. Therefore, the occurrence of damage to the output member 88 can be suppressed. Accordingly, the high connection accuracy of the driven member 63 is obtained.

Also in the fourth embodiment, as in the protection member 28A of the second embodiment, a configuration where the protection member 89 is provided also on the radial facing surface S2 of the output member 88 may be adopted. In addition, also in the fourth embodiment, the protection member 89 may be provided with an extension portion that is hung on a part of an oil seal 91, and the protection member 89 may function as a member for preventing the oil seal 91 from coming off.

Fifth Embodiment

Figure 7:
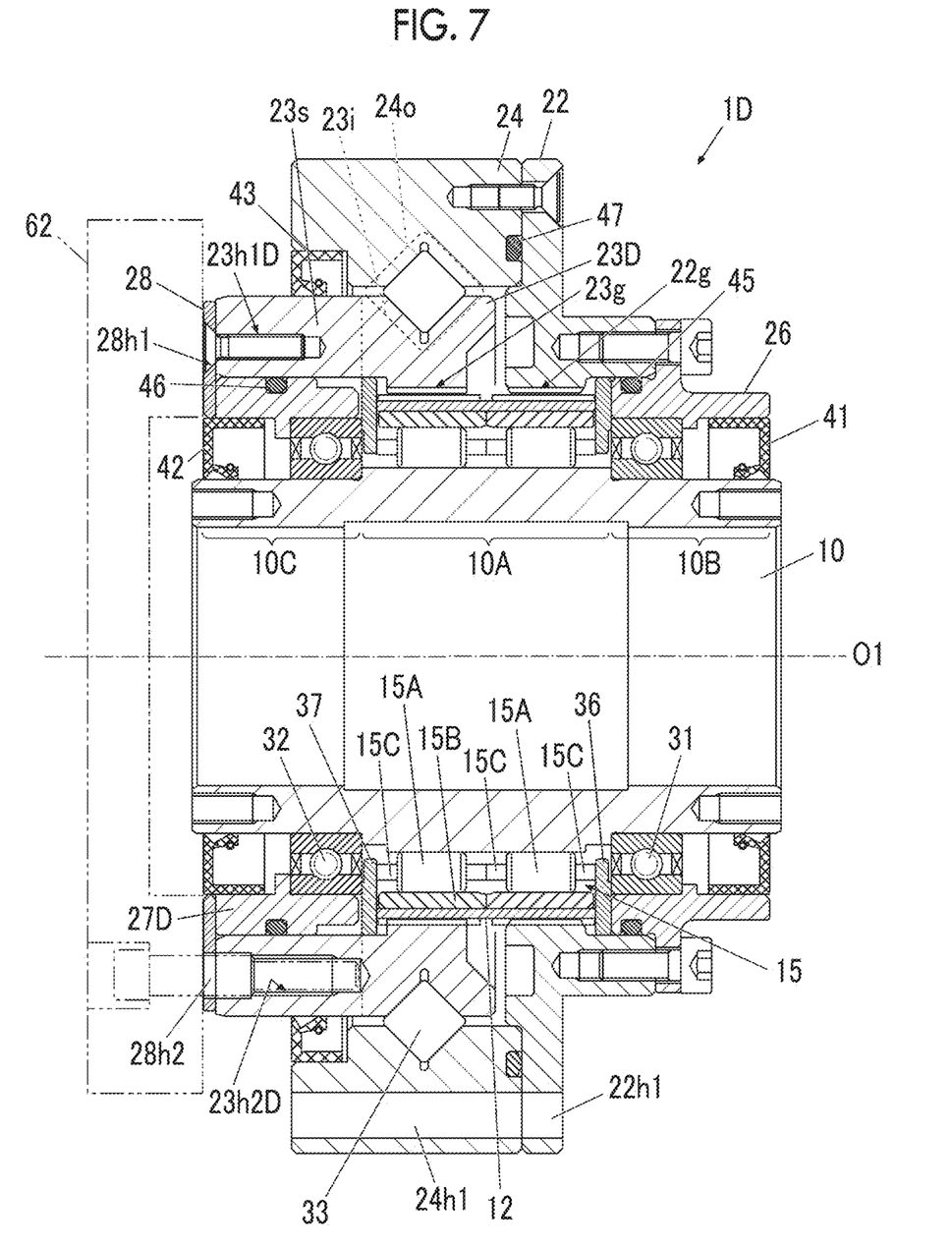
FIG. 7 is a sectional view illustrating a speed reducer according to a fifth embodiment of the present invention.

FIG. 7 is a sectional view illustrating a speed reducer according to a fifth embodiment of the present invention. A speed reducer 1D of the fifth embodiment is almost the same as the speed reducer 1 of the first embodiment except that the member connected to the driven member 62 and the member formed of a material having low specific gravity are different. The same components will be assigned with the same reference signs, and detailed description thereof will be omitted.

A second member 23D is extended in the axial direction to a position where the annular portion 23s comes into contact with the protection member 28, and other than that, it is the same as the second member 23 of the first embodiment. The second member 23D has bolt holes 23h1D and 23h2D communicating with the bolt holes 28h1 and 28h2 of the protection member 28. The second member 23D also functions as an output member connected to the driven member 62 via a connection member (bolt). The second member 23D is formed of a steel material like the second member 23 of the first embodiment.

A bearing housing 27D has no flange portion 27f (FIG. 1) interposed between the protection member 28 and the second member 23D, and other than that, it is the same as the second cover 27 of the first embodiment. The bearing housing 27D is formed of a lightweight material like the second cover 27 of the first embodiment. The bearing housing 27D is internally fitted into the annular portion 23s of the second member 23D. The bearing housing 27D may make rotating motion integrally with the second member 23D, or may be configured to slide in the rotation direction with respect to the second member 23D. The bearing housing 27D corresponds to an example of the first member according to the embodiment of the present invention.

The protect ion member 28 is interposed between the driven member 62 and the second member 23D and between the driven member 62 and the bearing housing 27D, and covers an end surface of the bearing housing 27D on an output side. The protection member 28 is adjacent to at least a part of the bearing housing 27D in the axial direction. Herein, "adjacent" means to include being adjacent with a gap therebetween.

As described above, in the speed reducer 1D of the fifth embodiment, the bearing housing 27D has specific gravity lower than the first internal gear 22g, the second internal gear 23g, and the external gear 12, and has hardness lower than the driven member 62. Further, on the load side of the bearing housing 27D, the protection member 28 formed of a material having hardness higher than the bearing housing 27D is provided. Therefore, the weight saving of the bearing housing 27D can reduce the moment of inertia of the internal mechanism of the speed reducer 1D. In addition, when connecting the speed reducer 1D and the driven member 62 to each other, the occurrence of damage to the bearing housing 27D formed of a lightweight material is suppressed, and the high connection accuracy of the driven member 62 is obtained.

Sixth Embodiment

Figure 8:
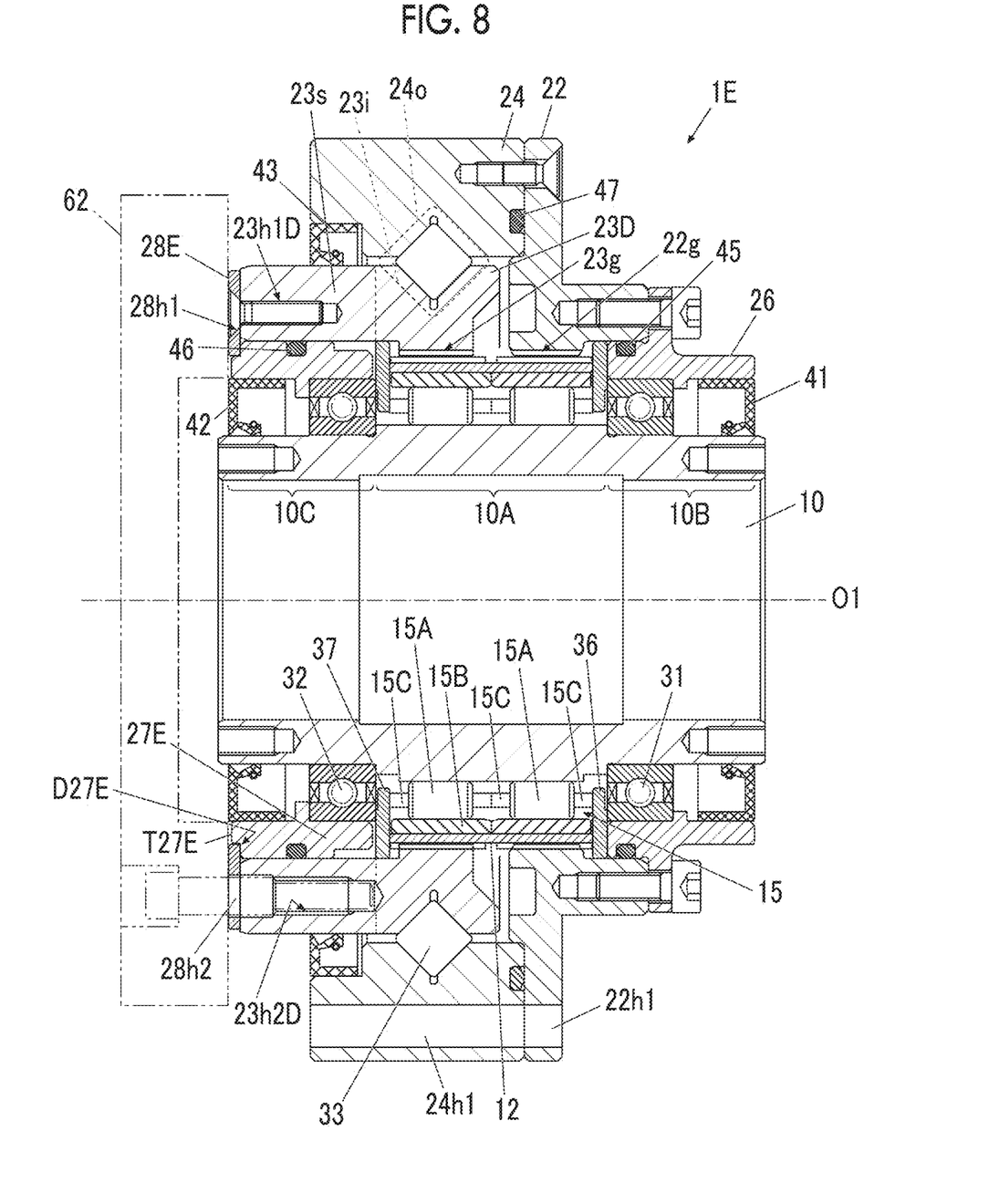
FIG. 8 is a sectional view illustrating a speed reducer according to a sixth embodiment of the present invention.

FIG. 8 is a sectional view illustrating a speed reducer according to a sixth embodiment of the present invention. A speed reducer IE of the sixth embodiment is different only in terms of forms of a bearing housing 27E and a protection member 28E, and other components are the same as in the speed reducer 1D of the fifth embodiment. The same components will be assigned with the same reference signs, and detailed description thereof will be omitted.

The protection member 28E covers end surfaces of the bearing housing 27E and the second member 23D on the load side. However, in the sixth embodiment, among the end surfaces on the load side, the protection member 28E covers a part of the bearing housing 27E in the radial direction (for example, a range close to an outer periphery), and does not cover the remaining portion (for example, a range close to the center). The protection member 28E is adjacent to at least a part of the bearing housing 27E in the axial direction. Herein, "adjacent" means to include being adjacent with a gap therebetween. Other than that, it is the same as the protection member 28 of the first embodiment.

Due to the form of the protection member 28E, the bearing housing 27E has an end surface T27E facing the driven member 62 without the protection member 28E being interposed on the load side. However, the end surface T27E is positioned on a counter load side in the axial direct ion f roman end surf ace of the protect ion member 28E on the load side. Therefore, when the driven member 62 is connected, a gap is interposed between the end surface T27E and the driven member 62, and the end surface T27E does not come into contact with the driven member 62. The bearing housing 27E has a step portion D27E having a different height in the axial direction on the end surface on the load side, and a part of the protection member 28E is positioned at a lowered location of the step portion D27E. Accordingly, the bearing housing 27E is not displaced to a position of coming into contact with the driven member 62, and the entire end surface of the bearing housing 27E on the load side is protected. Other configurations of the bearing housing 27E are the same as in the bearing housing 27D of the fifth embodiment. The bearing housing 27E corresponds to an example of the first member according to the embodiment of the present invention.

In a case where the driven member 62 has a form in which there is a notch or a dent in a portion facing the end surface T27E of the bearing housing 27E or a form in which there is no portion facing the end surface T27E, the end surface T27E may be at the same position in the axial direction as the end surface of the protection member 28E on the load side, or may protrude to the load side within a range of not coming into contact with the driven member 62.

As described above, in the speed reducer IE of the sixth embodiment, the bearing housing 27E has specific gravity lower than the first internal gear 22g, the second internal gear 23g, and the external gear 12, and has hardness lower than the driven member 62. Further, at a part of the bearing housing 27E on the load side, the protection member 28E formed of a material having hardness higher than the bearing housing 27E is provided. Therefore, the weight saving of the bearing housing 27E can reduce the moment of inertia of the internal mechanism of the speed reducer IE. In addition, when connecting the speed reducer IE and the driven member 62 to each other, the occurrence of damage to the bearing housing 27E formed of a lightweight material is suppressed, and the high connection accuracy of the driven member 62 is obtained.

Heretofore, each of the embodiments of the present invention has been described. However, the present invention is not limited to the embodiments. For example, in the first to third embodiments, the fifth embodiment, and the sixth embodiment, a configuration where a so-called tubular flexible meshing type gear device is applied as a speed reducer has been described as an example. However, the reduction mechanism is not particularly limited in the present invention, and the reduction mechanism is also applicable to, for example, a so-called cup type or top hat type flexible meshing type gear device. Further, the present invent ion may be applied to a center crank type eccentric oscillation type speed reducer as shown in the fourth embodiment, a so-called sorting type eccentric oscillating reduction gear in which two or more shafts having eccentric bodies are arranged to offset from the axial center of a speed reducer, or a simple planetary gear.

In addition, although a configuration where the hardness of the first member is lower than the hardness of the driven member has been described as an example in the embodiments, a configuration where the hardness of the first member is higher than the hardness of the driven member may be adopted. For example, it can be assumed that the first member is formed of duralumin and the driven member is formed of aluminum. In such a case, the protection member may be formed of a material having hardness lower than the first member, such as resin and rubber. Accordingly, the occurrence of damage to the driven member due to the first member can be suppressed.

In addition, an example in which materials for both of the internal gear (the first internal gear 22g and the second internal gear 23g) and the external gear 12 have higher specific gravity and higher hardness than the first member has been described in the embodiments. However, the material for any one of the internal gear and the external gear may have the same specific gravity and the same hardness as the first member. Alternatively, the material for any one of the internal gear and the external gear may have lower specific gravity and lower hardness than the first member. The material for each of the first member, the internal gear, the external gear, the driven member, and the protection member according to the embodiments of the present invention is not limited to the examples described in the embodiments. In the speed reducer according to the embodiments of the present invention, a relationship in which the first member has specific gravity lower than at least one of the internal gear and the external gear, the first member has hardness lower than the driven member, and the protection member has hardness higher than the first member need only be satisfied. Alternatively, in the speed reducer according to the embodiments of the present invention, a relationship in which the first member has specific gravity lower than at least one of the internal gear and the external gear, the first member has hardness higher than the driven member, and the protection member has hardness lower than the first member need only be satisfied. In addition, the details described in the embodiments can be appropriately changed without departing from the gist of the invention.

The present invention can be used in a speed reducer.

It should be understood that the invention is not limited to the above-described embodiment, but may be modified into various forms on the basis of the spirit of the invention. Additionally, the modifications are included in the scope of the invention.

What is claimed is:

1. A speed reducer that includes a reduction mechanism, which includes an internal gear and an external gear meshing with the internal gear, and a first member, and transmits rotating motion decelerated by the reduction mechanism to a driven member, comprising:

a protection member disposed between the first member and the driven member,
   wherein the first member is formed of a material having specific gravity lower than at least one of the internal gear and the external gear and hardness lower than the driven member, and
   the protection member is formed of a material having hardness higher than the first member.

2. The speed reducer according to claim 1,
   wherein the first member is a member to which the rotating motion decelerated by the reduction mechanism is transmitted.

3. The speed reducer according to claim 1, further comprising:
   an output member that is connected to the driven member and outputs the rotating motion decelerated by the reduction mechanism,
   wherein the protection member is in contact with axial end surfaces of both of the first member and the output member.

4. The speed reducer according to claim 1,
   wherein the first member is an output member that is connected to the driven member and outputs the rotating motion decelerated by the reduction mechanism.

5. The speed reducer according to claim 4, wherein the protection member is in contact with axial end surfaces of the output member.

6. The speed reducer according to claim 1,
   wherein the first member has an axial facing surface facing the driven member in an axial direction and a radial facing surface facing the driven member in a radial direction,
   the protection member is provided at the axial facing surface and the radial facing surface, and has a tubular extension portion along the radial facing surface of the first member, and
   a recessed portion of the driven member is fitted to an outer periphery of the tubular extension portion of the protection member.

7. The speed reducer according to claim 1, further comprising:
   a second member that has a raceway surface of an inner ring of a bearing rotatably supporting the internal gear and is formed of the same material as the internal gear,
   wherein the first member is connected to the second member.

8. The speed reducer according to claim 7,
   wherein the internal gear is a flexible meshing type gear device including a first internal gear and a second internal gear, and
   the second member is formed of a single material integrally with the second internal gear.

9. The speed reducer according to claim 1,
   wherein the protection member functions as a retaining member for an oil seal adjacent to the first member.

10. A speed reducer that includes a reduction mechanism, which includes an internal gear and an external gear meshing with the internal gear, and a first member, and transmits rotating motion decelerated by the reduction mechanism to a driven member, comprising:
    a protection member disposed between the first member and the driven member,
    wherein the first member is formed of a material having specific gravity lower than at least one of the internal gear and the external gear and hardness higher than the driven member, and the protection member is formed of a material having hardness lower than the first member.

* * * * *